United States Patent
Schuffenhauer et al.

(10) Patent No.: US 9,073,124 B2
(45) Date of Patent: Jul. 7, 2015

(54) SETTING MECHANISM FOR A SETTABLE TOOL HOLDER ADAPTOR, AND TOOL ADAPTOR

(75) Inventors: Michael Schuffenhauer, Furth (DE); Michael Hacker, Nuremberg (DE)

(73) Assignee: KENNAMETAL INC, Latrobe, PA (US)

( * ) Notice: Subject to any disclaimer, the term of this patent is extended or adjusted under 35 U.S.C. 154(b) by 332 days.

(21) Appl. No.: 13/527,830

(22) Filed: Jun. 20, 2012

(65) Prior Publication Data
US 2013/0001900 A1    Jan. 3, 2013

(30) Foreign Application Priority Data
Jun. 20, 2011  (DE) .......................... 10 2011 104 982

(51) Int. Cl.
*B23B 31/36*     (2006.01)
*B23B 29/034*   (2006.01)
*B23B 31/02*     (2006.01)

(52) U.S. Cl.
CPC ......... *B23B 29/03421* (2013.01); *B23B 31/026* (2013.01); *Y10T 279/26* (2015.01); *Y10T 279/25* (2015.01)

(58) Field of Classification Search
CPC ........................ B23B 31/026; B23B 29/03421
USPC ........ 279/6, 133, 16, 132; 408/150, 153, 156, 408/181; 409/234; 82/170
See application file for complete search history.

(56) References Cited

U.S. PATENT DOCUMENTS

| | | | | |
|---|---|---|---|---|
| 3,635,572 | A | * | 1/1972 | Robinson ...................... 408/181 |
| 4,218,068 | A | * | 8/1980 | Lutz et al. ..................... 408/146 |
| 4,428,704 | A | * | 1/1984 | Kalokhe ....................... 408/156 |
| 5,208,570 | A | * | 5/1993 | Nippert ......................... 335/261 |
| 5,286,042 | A | | 2/1994 | Laube |
| 5,533,847 | A | * | 7/1996 | Basteck ........................ 409/234 |
| 5,915,896 | A | * | 6/1999 | Koczarski et al. ............ 409/131 |
| 5,997,012 | A | * | 12/1999 | Brian ............................ 279/43.5 |
| 6,186,712 | B1 | * | 2/2001 | Senzaki ........................ 409/234 |
| 6,557,445 | B1 | * | 5/2003 | Ishikawa ........................ 82/158 |

OTHER PUBLICATIONS

German Patent Office, "Official Action", May 29, 2012, 5 pp.

* cited by examiner

*Primary Examiner* — Eric A Gates
*Assistant Examiner* — Paul M Janeski
(74) *Attorney, Agent, or Firm* — Larry R. Meenan

(57) ABSTRACT

A setting mechanism for a settable tool holder adapter includes a differential screw having two thread portions of differing pitch but identical direction of hand and a pressure piece having a pressure piece thread. One of the thread portions of the differential screw is screwed into the thread of the pressure piece.

9 Claims, 2 Drawing Sheets

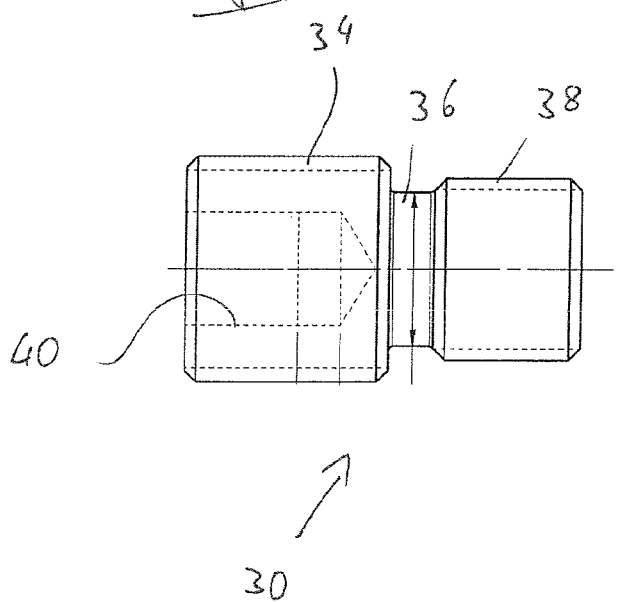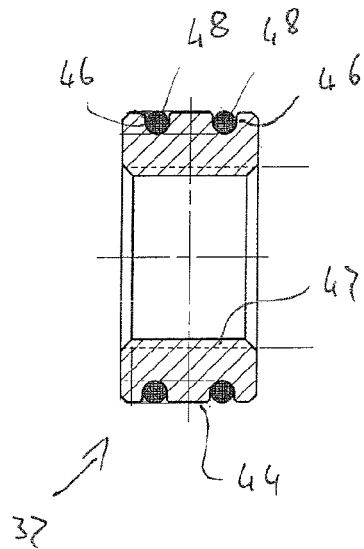

SETTING MECHANISM FOR A SETTABLE TOOL HOLDER ADAPTOR, AND TOOL ADAPTOR

BACKGROUND

1. Field of the Invention

The present invention generally relates to tool holder adapters and, more particularly, to setting mechanisms for settable tool holder adapters. The present invention further relates to tool holder adapters having such setting mechanisms.

2. Background Information

In the case of settable tool holder adapters, the tool is, in particular, a tool for precision machining of drilled holes, in particular by means of a reaming tool. For high accuracy in machining, the tool holder adapter can be set very precisely, such that its center axis coincides, within very narrow tolerances, with the center axis of a receiver assigned to the tool holder adapter. For this purpose a setting mechanism, inter alia, is provided, by means of which the tool holder adapter can be tilted relative to a receiver. As a result, the center axis of the tool holder adapter can be aligned parallel to the center axis of the receiver. Additionally provided is a radial adjusting mechanism, of no further relevance in the scope of the present invention, by which the position of the tool holder adapter relative to the receiver can be set in the radial direction. As a rough simplification, the setting mechanism and the adjusting mechanism can be considered together as a type of joint, by which the tool holder adapter is coupled to the receiver. The adjusting mechanism ensures that the joint is located at the correct position, i.e. with its center axis on the center axis of the receiver, and the setting mechanism ensures that the center axis of the tool holder adapter runs in the extension of the center axis of the receiver.

In the prior art, the setting mechanism is in each case constituted by a setting screw, of which there are four provided on a collar of the tool holder adapter. Provided in the collar there is a thread, into which the setting screws are screwed, such that their end that faces away from the screw head extends through the collar. There, each setting screw bears on a mating surface of the receiver. Appropriate setting of the four setting screws enables the angular position of the tool holder adapter to be set relative to the receiver. The setting screws in this case act in the manner of settable spacers.

There is however, room for improvement in such tool holder adaptors, such as, for example, in setting mechanisms that enable more precise setting of the tool.

SUMMARY OF THE INVENTION

As an aspect of the invention a setting mechanism for a tool holder adaptor is provided. The setting mechanism comprises a differential screw having two thread portions of differing pitch but identical direction of hand, and comprises a pressure piece having a pressure piece thread, one of the thread portions of the differential screw being screwed into the thread of the pressure piece. The invention is based on the fundamental concept of using the differential screw to "step down" the advance that is obtained in the case of a predefined rotation of the setting screw. Unlike the prior art, in which a rotation of the setting screw results in an advance that corresponds to the thread pitch of the setting screw, in the case of the differential screw only an advance equal to the difference between the two thread pitches is obtained. Such arrangement enables the tool holder adapter to be set with much greater precision.

According to an example embodiment of the invention, the pressure piece is cylindrical and, on its exterior, is provided with an anti-rotation mechanism. The anti-rotation mechanism prevents the pressure piece of the differential screw from rotating concomitantly, no further measures being required in respect of the tool holder adapter.

According to a technically simple design, the anti-rotation mechanism can be constituted by an O-ring or, also, by two O-rings. In this way, a very inexpensive structure is achieved.

In particular, it can be provided that, in its circumferential surface, the pressure piece has at least one groove for receiving an O-ring. This ensures that the O-rings do not slip in the axial direction when the pressure piece is shifted by the differential screw.

According to an example embodiment of the invention, it is provided that the differential screw has a hexagon socket. This is particularly advantageous, since there is then no need to provide an external screw head, with the result that a very compact structure of the tool holder adapter is obtained.

According to an example embodiment of the invention, it is provided that one of the thread portions is an M10×1 thread and the other of the thread portions is an M8×0.75 thread. Owing to the resultant difference in the two pitches, one complete rotation of the setting screw results in the pressure piece being advanced axially by only 0.25 mm, such that the tool holder adapter can be set in a particularly precise manner.

As another aspect of the invention, a settable tool holder adapter, comprising at least one setting bore, in which there is disposed a setting mechanism as described above, is provided.

In an example embodiment, it is provided that the setting bore is a stepped bore, there being provided in one portion a setting thread, in which there engages one of the thread portions of the differential screw, and the other portion receiving the pressure piece. In this way, a very compact structure of the tool holder adapter is achieved, particularly in the axial direction.

In an example embodiment, it is provided that the pressure piece portion of the stepped bore has a cylindrical, smooth wall. The O-ring of the pressure piece can act on this wall, such that, without a large amount of mechanical means, the pressure piece is secured against unintentional concomitant rotation. Further, the setting mechanism can be mounted on the tool holder adapter with only a small amount of means.

A particularly advantageous aspect of the setting mechanism according to the invention consists in that tool holder adapters already in use can be retrofitted with only a small amount of means, since the thread portion of the differential screw that is assigned to the setting thread is the same as in the prior art. There is therefore no need here to cut new thread.

BRIEF DESCRIPTION OF THE DRAWINGS

A full understanding of the invention can be gained from the following description of an example embodiment when read in conjunction with the accompanying drawings in which:

FIG. 4 shows an enlarged side view of the differential screw used in the case of the tool holder adapter of FIGS. 2 and 3; and FIG. 5 shows a sectional view of the pressure piece used in the case of the tool holder adapter of FIGS. 2 and 3.

DESCRIPTION OF THE EXAMPLE EMBODIMENTS

Figure 1:
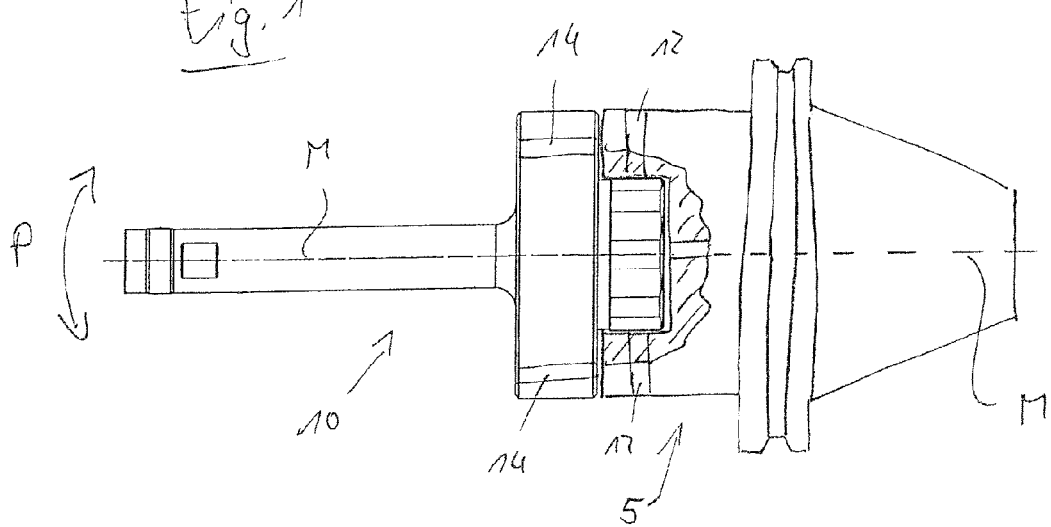
FIG. 1 shows a schematic representation of a tool holder adapter mounted on a receiver.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

FIG. 1 shows a receiver 5 that can be mounted, for example, in a machine tool (not shown). Disposed in the receiver 5 is a tool holder adapter 10, which serves to receive a reaming tool used to perform precision machining, for example of drilled holes.

The tool holder adapter 10 can be set in the radial direction by means of an adjusting mechanism 12 and, by means of a setting mechanism 14, can be swiveled slightly relative to the center axis M of the receiver 5 (see the arrow P in FIG. 1). The adjusting mechanism 12 serves to adjust the tool holder adapter 10 relative to the receiver 5, such that the center axis M of the receiver 5 and the center axis M of the tool holder adapter 10 coincide in the plane of the adjusting mechanism 12. The setting mechanism 14 serves to align the center axis M of the tool holder adapter 10 such that it extends exactly in an extension of the center axis M of the receiver 5. For this purpose, clearly, the tool holder adapter 10 can be tilted, not only in the direction of the arrow P, but also perpendicularly in relation to this arrow, i.e. in a direction perpendicular to the plane of the drawing.

Figure 2:
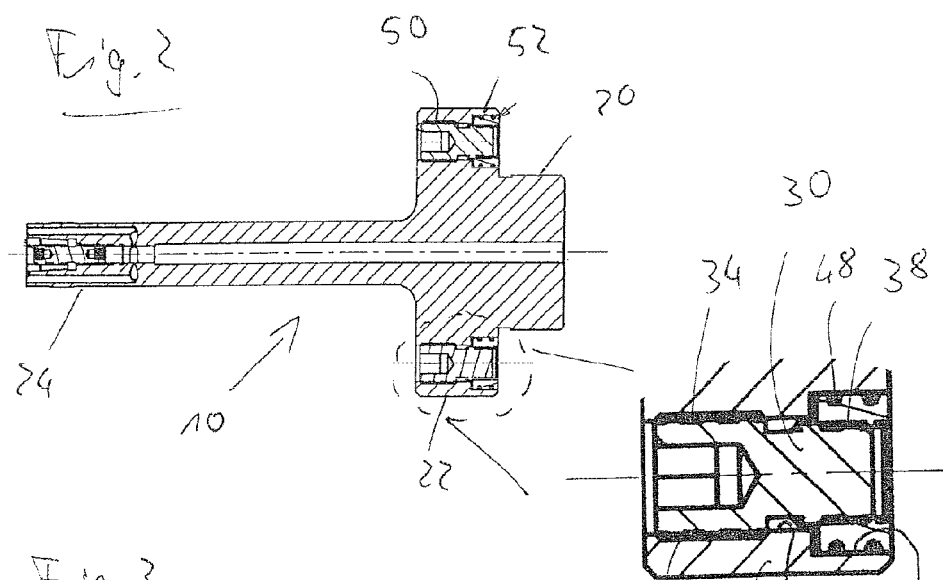
FIG. 2 shows a schematic longitudinal section through a tool holder adapter according to the invention.
Figure 3:
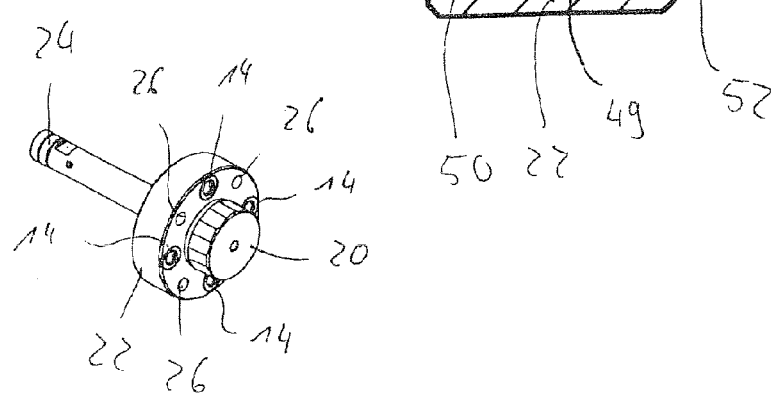
FIG. 3 shows a perspective view of the tool holder adapter of FIG. 2.

Referring to FIGS. 2 and 3, the tool holder adapter 10 has a coupling 20, which is disposed in the receiver 5 and on which the adjusting mechanism 12 acts, and has a collar 22, which is located between the coupling 20 and a tool side 24 of the tool holder adapter 10. The collar 22 has the basic shape of a cylindrical disk, and is provided with four fastening bores 26, which are provided to receive fastening screws (not shown), by means of which the tool holder adapter 10 can be fastened to the receiver 5. The fastening bores 26 are distributed uniformly, with an angular spacing of 90°, around the center axis M. As shown in FIG. 3, a total of four setting mechanisms 14 are disposed uniformly between the fastening bores 26, and therefore likewise at an angular spacing of 90° in relation to each other, in the collar 22 of the tool holder adapter 10.

Each setting mechanism 14 consists of a differential screw 30 (see FIG. 4) and a pressure piece 32 (see FIG. 5). The differential screw 30 has a first thread portion 34, which, in an example embodiment is provided with an M10×1 external thread. Adjoining the first thread portion 34 there is a waisted transition portion 36, which is succeeded, in turn, by a second thread portion 38. In an example embodiment the latter has an M8×0.75 external thread. On the end of the first thread portion 34, the differential screw 30 is provided with a hexagon socket 40, which in an example embodiment is 5 mm. The thread on the two thread portions 34,38 have the same direction of hand, preferably right hand.

The pressure piece 32 is realized in the form of a disk or ring, having an inner bore 42, into which a thread matching the thread portion 38 of the differential screw is cut. Accordingly, in an example embodiment, inner bore 42 has an M8×0.75 internal thread. The circumferential surface 44 is realized so as to be smooth and cylindrical, two continuous grooves 46 being realized in the circumferential surface 44.

An O-ring 48 is disposed in each of the grooves 46. These O-rings project slightly over the circumferential surface 44.

Referring to FIG. 2, a stepped bore 49, having a setting screw portion 50 and a pressure piece portion 52, is in each case provided in the collar 22, in order to receive the setting mechanism 14. In an example embodiment, the setting screw portion 50 is provided with an M10×1 internal thread, i.e., corresponding to the first thread portion 34. The pressure piece portion 52, which is disposed on the side of the coupling 20, and therefore on the side that faces towards the receiver 5, is realized as a cylindrical bore having a smooth wall. The dimensions of the pressure piece portion 52 are such that the two O-rings 48 bear with bias on the cylindrical wall of the pressure piece portion 52.

When the differential screw 30 is rotated (to the right in the case of a right handed thread), it is screwed more deeply into the thread in the collar 22 of the tool holder adapter 10. Since the two thread portions 34, 38 have a thread having the same direction of hand, the differential screw is at the same time screwed more deeply into the pressure piece 32. Owing to the difference in the pitches of the two threads of the differential screw, the latter is screwed more deeply into the collar 22, for example, without limitation, by 1 mm in the case of one complete turn, while it is screwed into the pressure piece 32 by only 0.75 mm. The result of this is an axial forward movement of the pressure piece 32 by 0.25 mm, i.e. an advance of the pressure piece out of the pressure piece receiver 52. The O-rings 48 in this case prevent the pressure piece 32 from rotating concomitantly in the circumferential direction.

In the initial state, the four pressure pieces 32 are located inside the pressure piece portion 52 of the stepped bore. The tool holder adapter 10 is then mounted on the receiver 5, such that the pressure pieces are directly opposite the end face of the receiver 5. If it is found that the center axis M of the tool holder adapter 10 deviates from the desired position towards one side, the differential screw 30 (or, if appropriate, the two differential screws 30), toward which the center axis is inclined, is actuated. As a result, the corresponding pressure piece 32 is adjusted to the right in respect of FIG. 2, i.e. pressed out of the collar 22, such that the tool holder adapter 10 is pressed away from the receiver 5 on this side, and the center axis M comes closer to the desired position. In this way (perhaps iteratively), the desired alignment of the center axis M can be obtained.

While a specific embodiment of the invention has been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A settable tool holder adapter structured to be rotated about a center axis, the tool holder adaptor comprising:
   a collar disposed about the center axis, the collar including at least one setting bore formed therethrough, the setting bore having a center axis disposed generally parallel to the center axis; and
   a setting mechanism disposed in the setting bore, the setting mechanism comprising:
      a differential screw having two thread portions of differing pitch but identical direction of hand; and a pressure piece having a pressure piece thread, one of the thread portions of the differential screw being screwed into the thread of the pressure piece.

2. The tool holder adapter of claim 1 wherein the at least one setting bore is a stepped bore having two portions, there being provided in one of the two portions a setting thread, in which there engages one of the two thread portions of the differential screw, and the other portion of the two portions receiving the pressure piece.

3. The tool holder adapter of claim 2 wherein the other portion of the two portions has a cylindrical, smooth wall.

4. The tool holder adapter of claim 3 wherein the pressure piece is provided with at least one O-ring, which bears frictionally on the wall of the other portion of the two portions.

5. The tool holder adaptor of claim 4 wherein the pressure piece is cylindrical and, in its circumferential surface, the pressure piece has at least one groove for receiving the at least one O-ring.

6. The tool holder adaptor of claim 1 wherein the thread portion of the differential screw which is screwed into the thread of the pressure piece is of a lessor pitch than the other thread portion of the differential screw.

7. The tool holder adaptor of claim 1 wherein the collar includes four setting bores, each being disposed at an equal angular spacing about the center axis.

8. The tool holder adaptor of claim 1 wherein the differential screw includes a hexagon socket.

9. The tool holder adaptor of claim 1 wherein one of the two thread portions is an M10×1 thread and the other of the two thread portions is an M8×0.75 thread.

* * * * *